No. 826,277. PATENTED JULY 17, 1906.
W. J. RUMP.
NOZZLE FOR SAUSAGE STUFFERS AND LARD PRESSES.
APPLICATION FILED DEC. 17, 1903.

Witnesses:
Frank L. A. Graham
Titus H. Lyons

Inventor:
William J. Rump.
by his Attorneys
Howson & Howson

UNITED STATES PATENT OFFICE.

WILLIAM J. RUMP, OF RAVINE, PENNSYLVANIA, ASSIGNOR TO THE ENTERPRISE MANUFACTURING COMPANY OF PENNSYLVANIA, OF PHILADELPHIA, PENNSYLVANIA, A CORPORATION OF PENNSYLVANIA.

NOZZLE FOR SAUSAGE-STUFFERS AND LARD-PRESSES.

No. 826,277.     Specification of Letters Patent.     Patented July 17, 1906.

Application filed December 17, 1903. Serial No. 185,552.

*To all whom it may concern:*

Be it known that I, WILLIAM J. RUMP, a citizen of the United States, and a resident of Ravine, Schuylkill county, Pennsylvania, have invented certain Improvements in Nozzles for Sausage-Stuffers and Lard-Presses, of which the following is a specification.

My invention relates to certain improvements in nozzles used in connection with sausage-stuffers and lard-presses which will allow air to escape from the casing of a sausage as it is being stuffed.

The object of my invention is to make a substantial nozzle of the type above described. This object I attain in the following manner, reference being had to the accompanying drawings, in which—

Figure 1:
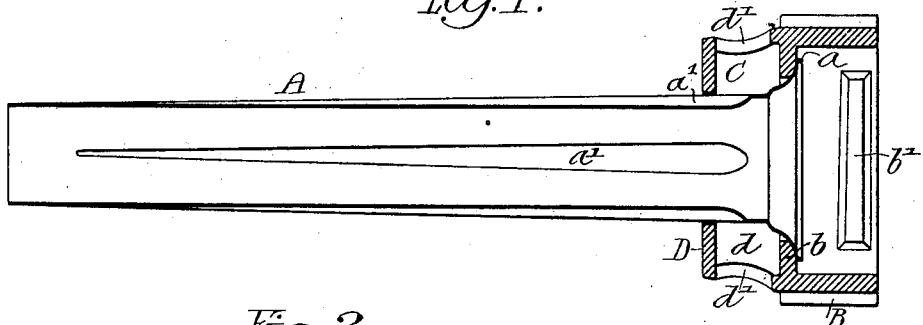
Figure 2:
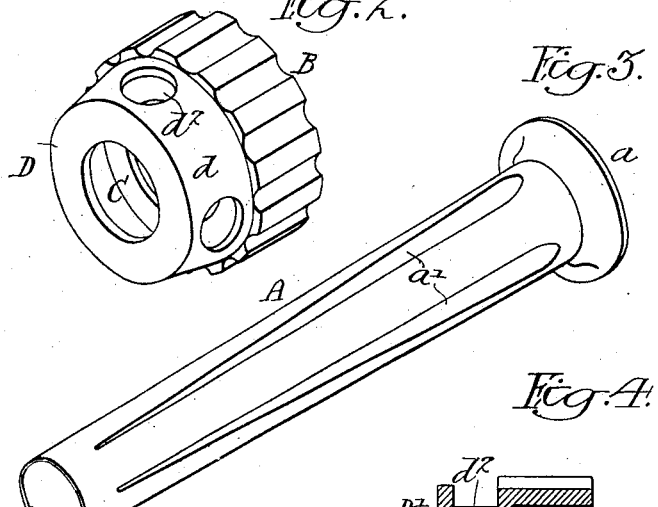
Figure 3:
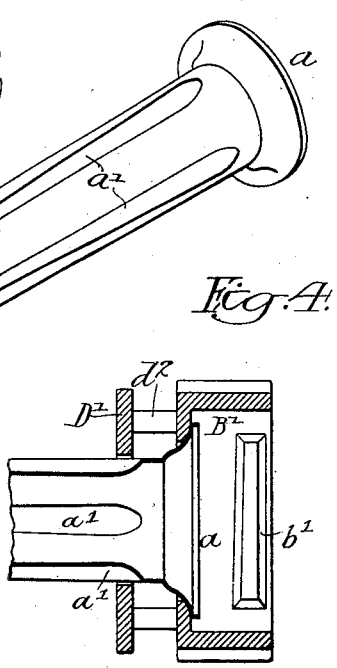
Figure 4:
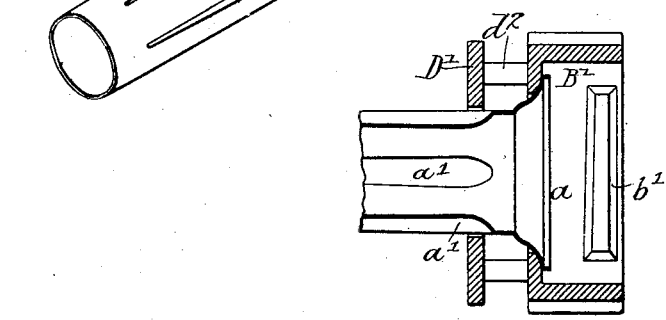

Figure 1 is a longitudinal sectional view illustrating my improved nozzle and coupling. Fig. 2 is a perspective view of the coupling. Fig. 3 is a perspective view of the nozzle. Fig. 4 is a view of a modification of my invention.

A is the nozzle, preferably made tapered in form and having a flange $a$ at the rear end fitting back of the flange $b$ on the coupling B. In the present instance this coupling has tapered internal lugs $b'$, which form a broken screw and correspond with similar lugs on the casing of the sausage-stuffer or lard-press. The coupling can be rigidly secured to the casing by turning it a half-turn, a flange $a$ of the nozzle A being clamped between the casing and the coupling, forming a comparatively tight joint.

The nozzle A has a series of longitudinal grooves $a'$ formed therein, in the present instance by indenting the metal, although it will be understood that these grooves may be formed in any suitable manner. The grooves extend from a point near the outer end of the nozzle to a point near the coupling B. These grooves allow the air to escape from the cover of the sausage as it is being stuffed. The cover in many instances fits tightly over the nozzle, and if some such provision is not made for the escape of air the entrapped air will burst the casing.

In order to prevent the sausage-casings closing the inner ends of the air-grooves in the nozzle, guard-plates have been mounted on the nozzle; but as the guard-plates have to be made small, so as to pass through the opening in the coupling, they do not prevent the casings choking the air-outlets, as it will be understood that several lengths of sausage-casings are placed upon the nozzle at one time. I overcome this difficulty by mounting the guard-plates directly upon the coupling, so that it can be made in such dimensions that it will prevent the sausage-casings closing the air-outlets.

I preferably make the guard and coupling in one piece, as shown in Figs. 1 and 2, in which B is the coupling, and D the guard, placed a sufficient distance in front of the flange $b$ of the coupling as to form an air-chamber C. The section $d$ inclosing said chamber having one or more outlet-openings $d'$ for the free escape of air, the parts are so proportioned that the guard D extends over the air-channels $a'$ in the nozzle, and consequently these channels communicate with the air-chamber C.

In Fig. 4 I have shown the guard D' made in a separate piece and secured by posts $d^2$ to the nozzle B'.

By the construction above described I provide a heavy and substantial guard which will be independent of the nozzle and not liable to be injured or affected by the heat when the nozzle is used in connection with a lard-press.

I claim as my invention—

1. The combination of a nozzle having a flange at one end and a longitudinal air-channel, a coupling extending over the flange, the outer end of the coupling extending over the inner end of the longitudinal air-channel, said coupling having an air-passage which communicates with the air-channel of the nozzle, substantially as described.

2. The combination of a nozzle having a flange at one end and longitudinal air-channels, with a coupling having a clamping-flange for securing the nozzle in position and having a guard extending over the air-channels in the nozzle, the coupling having an air-passage communicating with the air-channels of the nozzle, substantially as described.

3. The combination of a nozzle having a flange at one end and a longitudinal air-channel therein, with a coupling having a clamping-flange for securing the nozzle in position and having a guard in advance of said flange, said guard extending over the air-channel in the nozzle, the coupling having an air-passage between the guard and the clamping-flange, said air-passage communicating with the longitudinal air-channel in the nozzle, substantially as described.

4. The combination of a nozzle having a flange at one end, a longitudinal air-channel extending to a point near the flange, with a coupling having a clamping-flange engaging the flange of the nozzle and having a lock which is arranged to engage the casing of the machine to which the nozzle is applied when the coupling is turned, said coupling having a guard in advance of the flange and extending over the longitudinal air-channel in the nozzle so as to form an air-space between the guard and the flange, said air-space communicating with the air-channel in the nozzle, substantially as described.

In testimony whereof I have signed my name to this specification in the presence of two subscribing witnesses.

WILLIAM J. RUMP.

Witnesses:
G. L. CULLMERRY,
H. E. ASBURY.